US006744970B1

(12) United States Patent
Winter et al.

(10) Patent No.: US 6,744,970 B1
(45) Date of Patent: Jun. 1, 2004

(54) METHOD FOR PICTURE CODING AND DECODING, AND ALSO METHOD FOR CONSTRUCTING A SUB-PICTURE DATA UNIT FOR AN ELECTRONIC APPARATUS, ELECTRONIC APPARATUS, AND DATA CARRIER FOR USE IN AN ELECTRONIC APPARATUS

(75) Inventors: Marco Winter, Hannover (DE); Harald Schiller, Hannover (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/447,865

(22) Filed: Nov. 23, 1999

(30) Foreign Application Priority Data

Nov. 28, 1998 (DE) .......................................... 198 55 038

(51) Int. Cl.$^7$ ................................................ H04N 5/91
(52) U.S. Cl. .......................................... 386/95; 386/126
(58) Field of Search ............................ 386/46, 95, 111, 386/112, 98, 125, 126; 348/468

(56) References Cited

U.S. PATENT DOCUMENTS

| 5,715,356 A | | 2/1998 | Hirayama et al. | |
|---|---|---|---|---|
| 5,758,007 A | * | 5/1998 | Kitamura et al. | .............. 386/45 |
| 6,115,529 A | * | 9/2000 | Park | .............................. 386/1 |
| 6,229,523 B1 | * | 5/2001 | Czako | ......................... 345/601 |

FOREIGN PATENT DOCUMENTS

EP          0838948          4/1998

OTHER PUBLICATIONS

Li et al., "A Flexible Display Module for DVD and Set–Top Box Applications", IEEE Transactions on Consumer Electronics, vol. 43 No. 3, Aug. 1997, pp. 496–503.

* cited by examiner

Primary Examiner—Huy Nguyen
(74) Attorney, Agent, or Firm—Joseph S. Tripoli; Harvey D. Fried; Joseph J. Kolodka

(57) ABSTRACT

A method for picture coding and also in a corresponding method for the decoding of a picture. In the case of the first picture coding method, a digital picture is divided into at least two sections, which are then combined with one another before being coded. In this case, a combined pixel is generated in each case from the corresponding pixels in the sections to be combined, in such a way that the combined pixel is allocated an unambiguous type (A, B, C, D) which corresponds to the distribution of the pixel values in the pixel N-tuple of the corresponding pixels. The method for pixel coding can also be designed in such a way that two successive pictures of a picture sequence are, in the same way, combined with one another before being coded.

A method for constructing a sub-picture data unit for an electronic apparatus, in particular an apparatus appertaining to consumer electronics such as e.g. a DVD apparatus, being intended, where such sub-picture data units are used. Accordingly, the invention furthermore relates to an electronic apparatus as well.

19 Claims, 5 Drawing Sheets

```
Addr.:          SPU Bytes              #   Comments 0 0 0 0 : # # #  • • • • • • • • • • • • #  SPUH:
0 0 0 0 : 0 0    5C                     #  SPDSZ
0 0 0 2 : 0 0    27                     #  SP_DCSQTA 0 0 0 4 : # # #  • • • • • • • • • • • • #  PXD:
0 0 0 4 : 2 4    4A   47   A8   4A      #
0 0 0 9 : 7 4    56   80   46   5E      #
0 0 0 E : 5 8    46   58   65   80      #
0 0 1 3 : 4 6    5B   98   87   C7      #
0 0 1 8 : 8 0    24   00   00   00      #
0 0 1 D : 0 0    00   00   00   00      #  Stuffing Bytes
0 0 2 2 : 0 0    00   00   00   00      #

0 0 2 7 : # # #  • • • • • • • • • • • • #  SP_DCSQT:
0 0 2 7 : # # #  • • • • • • • • • • • • #  SP_DCSQ 0
0 0 2 7 : 0 0    00                     #  SP_DCSQ_STM
0 0 2 9 : 0 0    3F                     #  SP_NXT_DCSQ_SA=63
0 0 2 B : 0 3    11   11                #  SET_COLOR
0 0 2 E : 0 4    0F   F0                #  SET_CONTR  lower picture
0 0 3 1 : 0 5    07   80   80   19      #  SET_DAREA startx=120,
0 0 3 6 : 0 1    9F                     #  endx=128, starty=400, endy=415
0 0 3 8 : 0 6    00   04   00   04      #  SET_DSPXA uf=04, bf=04
0 0 3 D : 0 1                           #  STA_DSP
0 0 3 E : F F                           #  CMD_END 0 0 3 F : # # #  • • • • • • • • • • • • #  SP_DCSQ1
0 0 3 F : 0 0    57                     #  SP_DCSQ_STM⇒start frame 3C
0 0 4 1 : 0 0    47                     #  SP_NXT_DCSQ_SA=71
0 0 4 3 : 0 4    F0   F0                #  SET_CONTR  upper picture
0 0 4 6 : F F                           #  CMD_END 0 0 4 7 : # # #  • • • • • • • • • • • • #  SP_DCSQ2
0 0 4 7 : 0 0    AF                     #  SP_DCSQ_STM⇒start frame 6C
0 0 4 9 : 0 0    47                     #  SP_NXT-DCSQ_SA=71
0 0 4 B : 0 2                           #  STP_DSP
0 0 4 C : F F                           #  CMD_END
0 0 4 D : F F                           #  Stuffing
```

METHOD FOR PICTURE CODING AND DECODING, AND ALSO METHOD FOR CONSTRUCTING A SUB-PICTURE DATA UNIT FOR AN ELECTRONIC APPARATUS, ELECTRONIC APPARATUS, AND DATA CARRIER FOR USE IN AN ELECTRONIC APPARATUS

The invention relates to a method for picture coding and a method for picture decoding. The invention furthermore relates to a method for constructing a sub-picture data unit for an electronic apparatus, and also to an electronic apparatus. Apparatuses appertaining to consumer electronics, in particular, are considered as the electronic apparatus. Furthermore, the invention relates to a data carrier for use in an electronic apparatus.

BACKGROUND OF THE INVENTION

The invention is based on a method for picture coding of the generic type of the independent claim 1. Various picture coding methods are known from video technology. The picture coding method presented here follows a picture coding method which is used to generate so-called sub-picture data units for DVD apparatuses. DVD playback apparatuses of this type are already commercially available and each contain a sub-picture decoding device ("Sub-Picture Decoder") which can process the abovementioned sub-picture data units. A description of the picture coding method used is found e.g. in the DVD standard "DVD Specification for read-only disc" Part 3, Video Specification, Version 1.0, August 1996, Chapter 5.4.3 Sub-Picture Unit (SPU). The picture decoding method is also explained therein. A detailed description of the abovementioned sub-picture decoding devices is found in EP-A-0 725 541.

According to the DVD standard, the main application for sub-picture data units is e.g. the generation of subtitles on the screen of a television set. The subtitles are then inserted e.g. at the bottom edge of the picture. The bitmap data for a respective subtitle are then stored in the sub-picture data unit. In order to define the location of a subtitle on the screen and also in order to define a number of display characteristics, in particular colour, contrast, etc., simple graphical control commands are specified in the abovementioned DVD standard. Thus, in principle, sub-picture data units can also be used for other purposes, thus e.g. for operating instructions, operator guidance menus, animation pictures, intermission pictures, etc.

The essential parts of a sub-picture data unit according to the DVD standard consist in a data field for the bitmap data of the text to be displayed or, more generally, of the object to be displayed, and also in a second part in which so-called display control command sequences are stored which define the display location, the display time and also the display characteristics of the stored object. In the data field for the bitmap data, it is also perfectly well possible for a plurality of objects to be stored one after the other, which are each retrieved at different times.

If the intention is to provide a plurality of objects in a sub-picture data unit, then the DVD standard prescribes the instruction of respectively providing a corresponding area in the bitmap data field for each object. The bitmap data are then additionally subjected to run length coding in order to achieve picture compression and save memory space.

SUMMARY OF THE INVENTION

The object of the invention is to specify a picture coding method and a picture decoding method which allow the sub-picture data units on the one hand to be simplified and on the other hand to be modified such that memory space is saved yet the possibilities in respect of configuration are not impaired. The object set is achieved by means of the features of the independent claims 1 and 2 and also by means of the features of the independent claim 7.

In the case of the invention's method for picture coding, a digital picture is divided into at least two sections. A respective number of picture sections are subsequently coded in a combined manner. In this case, a combined pixel is generated in each case from the corresponding pixels in the sections to be combined, to be precise in such a way that the combined pixel is allocated an unambiguous type which corresponds to the distribution of the pixel values in the N-tuple of the corresponding pixels.

In the case of a further picture coding method according to the invention, two or more successive pictures are coded in a combined manner in a corresponding way.

These methods can advantageously be employed very well whenever essentially only two different pixel values are allowed for the individual pixels in the picture sections or pictures. This is the case whenever e.g. text is intended to be displayed in the picture. The picture can then be divided into the pixel values "On" and "Off". The N-tuple of the corresponding pixels then appears such that either the "On" value or the "Off" value holds true per element. An unambiguous pixel type is then allocated for the distribution of the "On"/"Off" values. In the simplest case, two picture sections are combined with one another. Consequently, the N-tuple consists of a pair of pixels. This case is defined more precisely in claim 3. If again just the two pixel values "On" and "Off" are allowed, it is necessary to define four different pixel types in accordance with the four different distributions of the pixel values in the respective pair of pixels.

Which pixel type is associated with which case is then defined more precisely in claim 4 for the four possible cases.

Although advantageous, with regard to the picture compression, it is not absolutely necessary for the picture sections that are to be combined to be combined with one another such that they overlap 100%. It is also perfectly allowable for the picture sections that are to be combined to be combined only in a partially overlapping manner, in which case absent pixels outside the overlap area are allocated the "Off" value. This measure is specified in claim 5. It has the advantage that, in this manner, the picture sections can be enlarged in the vertical direction in a simple way, without a great deal of memory space additionally having to be made available for this purpose.

The combination of two or more picture sections results in a single combined picture section comprising just as many pixels as an individual picture section. The pixel values or pixel types thus obtained can then also be subjected to run length coding for the purpose of further picture compression.

The invention likewise relates to a method for decoding a coded picture, see claim 7. This method for decoding is characterized in that a section with combined pixel values is decoded in a plurality of passes, in each pass one of the picture sections being reconstructed and different selection rules being employed in each case, which selection rules determine which value is to be assigned to a pixel in the corresponding pass. This method affords the advantage that the previously combined picture sections can be reconstructed without any losses, to be precise all of them one after the other in a plurality of passes, the same data record being accessed in each pass. As already explained above, the picture coding method allows, if appropriate, the saving of memory space for the picture to be displayed.

Advantageous measures, in particular with regard to the special case where only two picture sections or pictures are combined and the individual pixels in the picture sections can only assume the two possible values "On" and "Off", are mentioned in the dependent claims 8 and 9.

The invention furthermore consists in a method for constructing a sub-picture data unit for an electronic apparatus according to claim 10. The sub-picture data unit essentially comprises a data section having the pixel values for the sub-picture and a command section having display control command sequences. For such a method, it is advantageous if the data section having the pixel values for the sub-picture or the sub-pictures is divided into sections and coded in a combined manner, in the way specified in claims 1 to 6, and that a respective display control command sequence is then provided for the reproduction of the pixel values of one of the combined picture sections.

In this case, it is also advantageous if, in a display control command sequence for the reproduction of a picture section, a respective command is provided for defining the way in which the combined pixels are to be evaluated. For this purpose, in the case of DVD sub-picture data units, it is possible to utilize the commands SET_CONTR and CHG_COLCON defined in the DVD standard.

In order to distinguish four different pixel types from one another, in the application of DVD sub-picture data units, it is possible to use the pixel types "Background Pixel", "Pattern Pixel" "Emphasis 1 Pixel" and "Emphasis 2 Pixel" defined in the DVD standard.

Furthermore, the invention consists in a corresponding method for processing a sub-picture data unit. In accordance with the general teaching of the invention, for the reproduction of a picture section/picture, the combined pixels for this section/picture are evaluated in a specific, defined manner. In this case, for the reproduction of further combined picture sections/pictures, the combined pixels for these sections are then evaluated two or more times in succession in different ways. In the application of DVD sub-picture data units, as already mentioned, the commands SET_CONTR and CHG_COLCON defined in the DVD standard can be used to define the way in which the combined pixels are to be evaluated. In order to distinguish between four possible pixel types, it is again possible to use the pixel types "Background Pixel", "Pattern Pixel", "Emphasis 1 Pixel" and "Emphasis 2 Pixel" defined in the DVD standard.

The invention also consists in an electronic apparatus which has a sub-picture data unit constructed according to a method of claims 10 or 11 for the purpose of displaying a picture section or a picture.

Finally, the invention consists in a data carrier for use in an electronic apparatus which contains stored in it a sub-picture data unit as specified in the invention's method for constructing a sub-picture data unit.

BRIEF DESCRIPTION OF THE DRAWING

Exemplary embodiments of the invention are illustrated in the drawings and are explained in more detail in the description below. In the figures.

DESCRIPTION OF THE PREFFERED EMBODIMENTS

Figure 1:
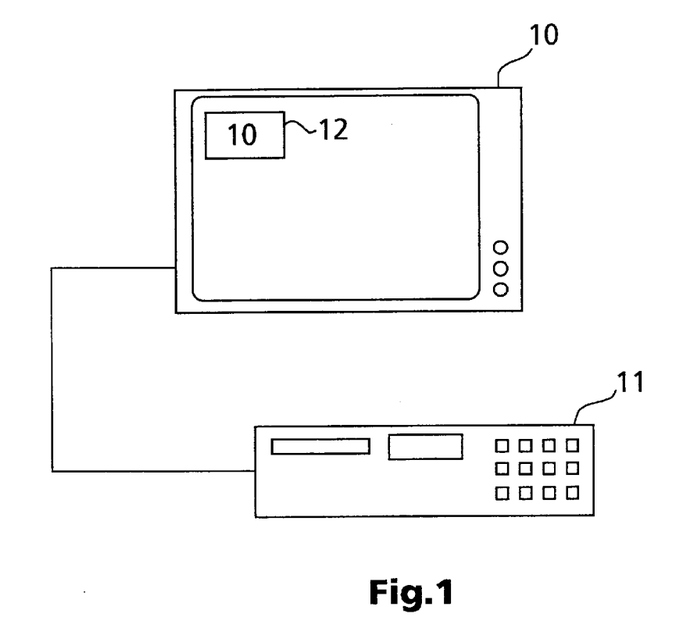
FIG. 1 shows a DVD playback apparatus and a connected television set which displays an inserted sub-picture on the screen.

The invention is explained using the example of DVD apparatuses. In FIG. 1, the reference 10 designates a conventional TV set. The reference 11 designates a DVD playback apparatus. The latter is connected to the TV set 10 via a coaxial lead, for example. The DVD playback apparatus 11 generates the analogue television signal which is fed into the TV set via the antenna socket, for example. The reference 12 designates an inserted sub-picture. According to the DVD standard, such sub-pictures are principally used for subtitles during video films. In the case illustrated, the sub-picture simply displays the number 10 on the screen. This is the first number of a countdown which runs from 10 to 1 and inserts one of the numbers 10 to 1 on the screen for example at intervals of a second in each case. In order to realize something of this type with sub-picture data units, the DVD standard offers in particular the possibilities of either generating 10 different sub-picture data units for the different insertions and allowing them to proceed or storing 10 different objects in a single sub-picture data unit, which are then each called up individually by means of display control command sequences.

Figure 2:
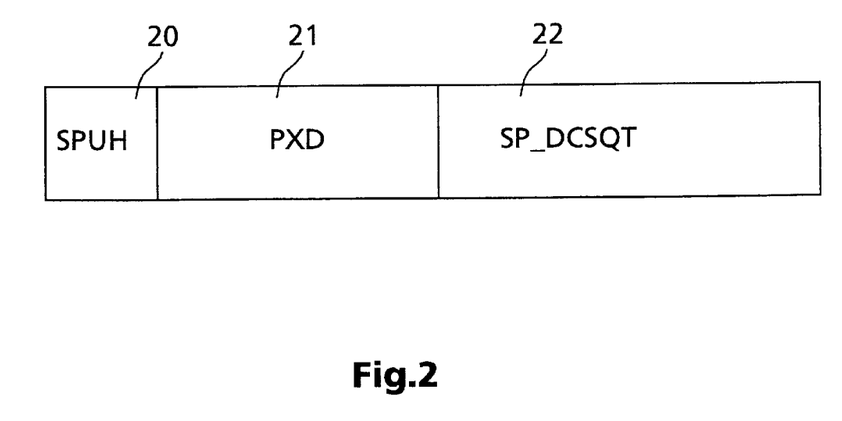
FIG. 2 shows an example of the known frame format for the data of the sub-picture data unit.

FIG. 2 gives a rough illustration of the known data format of a sub-picture data unit (SPU). The reference numeral 20 designates a data field for a header (SPUH) of the sub-picture data unit. The reference numeral 21 designates a data field for the compressed pixel data (PXD) of the sub-picture. The reference numeral 23 designates another data field for a display control command sequence table (SP_DCSQT). So-called display control command sequences (SP_DCSQ) are stored in the data field 22. The definition of the above-mentioned terms and also of the various display control commands is given in the DVD standard (version 1.0) mentioned in the introduction, with the result that not all of the details need be explained for the disclosure of the invention. With regard to the disclosure of the invention, therefore, reference is expressly made to this publication.

The pixel data in the datafield 21 determine the displayed pattern of the sub-picture indicated. For each pixel of a line of the sub-picture, a data word two bits wide specifies whether the pixel is a background pixel or a foreground pixel (pattern pixel) or whether the pixel is to be emphasized in a first manner (emphasis 1 pixel) or in a second manner (emphasis 2 pixel). These four distinctions can be made using the two bits. Specifically, the binary values denote:

00=background pixel
01=foreground pixel
10=pixel displayed with emphasis 1
11=pixel displayed with emphasis 2

It must be taken into account that the individual pixel data are not stored in this raw form in the memory, but rather in compressed form. Run length coding is carried out for this purpose. The run length coding method is likewise explained with a high degree of accuracy in the abovementioned DVD standard (version 1.0). Seven coding rules are stipulated for run length coding in the DVD standard mentioned. In this case, the run length coding operates such that a respective line of a field of the sub-picture to be displayed is subjected to run length coding. However, the individual rules will not be explained any more precisely here since they are sufficiently known from the abovementioned DVD standard. A relatively high degree of compression is obtained by the run length coding in the case of simple picture contents.

Figure 3:
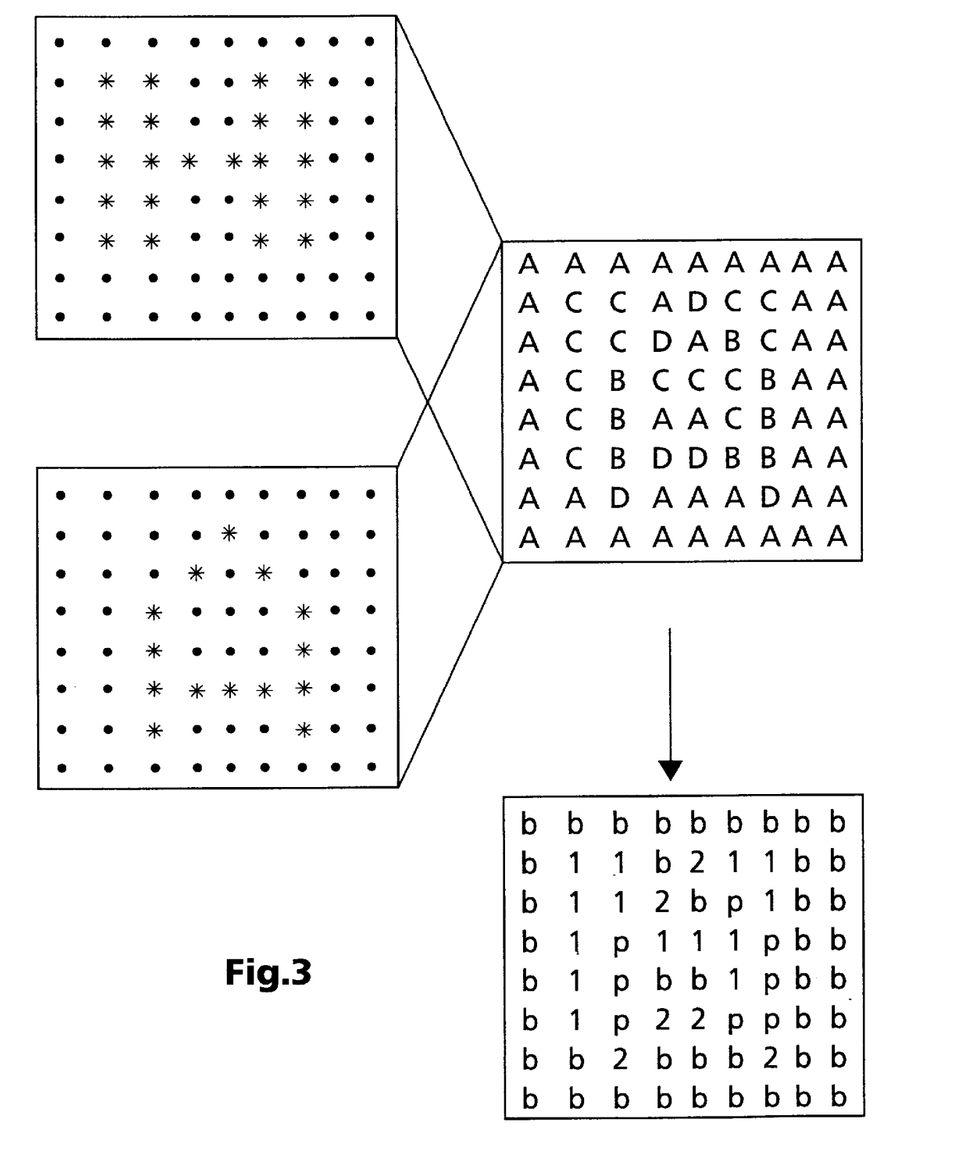
FIG. 3 shows an illustration for elucidating how two picture sections/pictures are combined with one another.

In one embodiment of the invention's method for picture coding, two or more sections of a picture are combined. This operation is illustrated in FIG. 3. In that case, the total picture consists of the two letters H and A, which are written one after the other. The two picture sections to be combined are illustrated one above the other in the left-hand part of FIG. 3. One section reproduces the letter H and the other picture section reproduces the letter A. The pixels of the letter are each marked by * and the pixels of the background by dots. The basic understanding in this case, then, is that a pixel can assume only two values in practice, namely whether the pixel is excited to illumination, which corresponds to the "On" state, or not, which corresponds to the "Off" state. The two picture sections illustrated each comprise 9×8 pixels. When these picture sections are combined, the second picture section is mentally placed over the first picture section, so that the pixels lie exactly one above the other. In this way, from the two picture segments, a combined picture segment having the same number of pixels is generated. In this case, the new pixel is derived from the pixels lying one above the other. The shifting of the picture sections over one another is indicated by strokes in FIG. 3. The combination of the pixels is then executed according to the following rules:

If the pixels to be combined are both in the "Off" state, then in the combined picture segment the combined pixel at this position is allocated pixel type A.

If the pixels to be combined both have the "On" value, then the combined pixel for this position is allocated pixel type B.

If the bottom pixel has the "On" value and the pixel lying above it has the "Off" value, then in the combined picture segment the pixel at this position is declared with pixel type C.

If the value of the bottom pixel is "Off" and that of the pixel lying above it is "On", then the combined pixel is allocated pixel type D. The result of these pixel combinations is reproduced at the top on the right in FIG. 3.

The bottom part of FIG. 3 then specifies how the assignment of the four pixel types A–D to the pixel types "Background", "Pattern", "Emphasis 1" and "Emphasis 2" defined in the DVD standard is made. By analogy, pixel type A becomes a "Background Pixel", pixel type B becomes a "Pattern Pixel", pixel type C becomes an "Emphasis 1 Pixel" and pixel type D becomes an "Emphasis 2 Pixel". These pixel types are correspondingly abbreviated in FIG. 3. This assignment should be regarded only as an example. Within the scope of the possible permutations of the four pixel types, 4!=24 different assignments are possible. The combined picture segment is thus finished and is then also subjected to run length coding for generating a sub-picture unit SPU conforming to the DVD standard.

In a supplementary manner, a further exemplary embodiment of the method according to the invention will also be explained. In this case, two individual pictures or sub-pictures are combined with one another in the same way. In that case, it is not then necessary to subdivide the individual picture into sections, rather each picture of a picture sequence is combined with a succeeding picture. This embodiment will be explained in more detail below in connection with FIGS. 4, 5 and 6.

Figure 4:
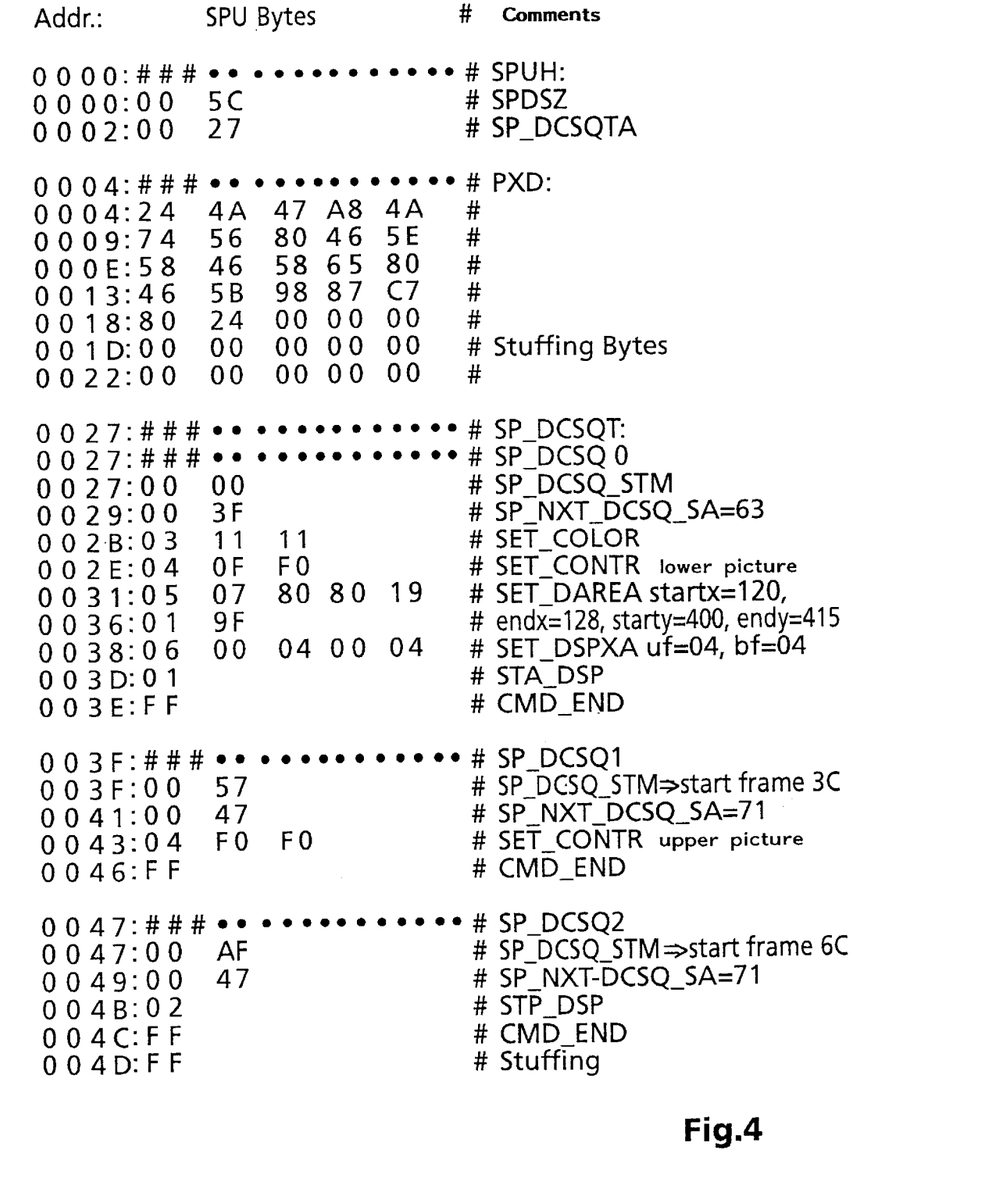
FIG. 4 shows a simple example of a sub-picture data unit corresponding to FIG. 3.

An example of a sub-picture data unit for a DVD playback apparatus is specified in FIG. 4. This sub-picture data unit contains the two letters A and H, illustrated in FIG. 3, as a combined picture. The right-hand part of FIG. 4 in each case specifies a short commentary for explanation. The left-hand part of FIG. 4 in each case specifies firstly the memory address and secondly the data bytes stored under the specified address, in hexadecimal notation. The upper part of FIG. 4, headed with SPUH, corresponds to the header 20 of FIG. 2. The middle part of FIG. 4, headed with PXD, corresponds to the data field 21 for the bitmap data of the sub-picture data unit. The lower part of FIG. 4, headed with the reference symbol SP_DCSQT, corresponds to the data field 22 having the command codes. In the header of the sub-picture data unit, the size of the data unit is specified with the command SPDSZ. In this case, all the numerical details are specified in decimal notation in the right-hand part of FIG. 4. The start of the data area for the display control commands is specified by the command SP_DCSQTA. The bitmap data for the picture segments to be displayed are contained in the PXD area. The data bytes specified contain the run length code words for the combined picture segment in accordance with the bottom part of FIG. 3. So-called stuffing bytes follow, starting from the address $001A. The said stuffing bytes are inserted in order to fulfil the rule defined in the DVD standard that the SP_DCSQT data area must not be larger than half of the entire sub-picture data unit. The display control commands of a sequence are in each case successively listed in the data area for the display control command sequences. The first display control command sequence is designated by SP_DCSQ0. The command SP_DCSQ STM defines the instant at which the display control command sequence is to be processed relative to the start of the entire sub-picture data unit. The detail in the first display control command sequence SP_DCSQO specifies that the first display control command sequence is started directly after the start of the sub-picture data unit. The pointer command SP_NXT_DCSQ_SA points to the beginning of the next display control command sequence. In the case of the first display control command sequence SP_DCSQ0, the memory address $003F is specified, which also exactly corresponds to the beginning of the second display control command sequence SP_DCSQ1. The colour of the pixels of the sub-picture data unit for background, foreground, etc. is defined by the command SET_COLOR. The next command SET_CONTR sets the contrast for the pixels of the sub-picture data unit. The specified values $0F and $F0 effect selection of which of the two combined picture segments is intended to be reproduced in this display control command sequence. Specifically, it is thereby stipulated that all "Emphasis 2" and "Background Pixels" reproduce the "Off" value for a pixel and the pixel types "Emphasis 1" and "Pattern" produce the "On" value. Thus, this command is used to select which picture section is intended to be reproduced. In this case it is the picture section comprising the letter H.

Figure 6:
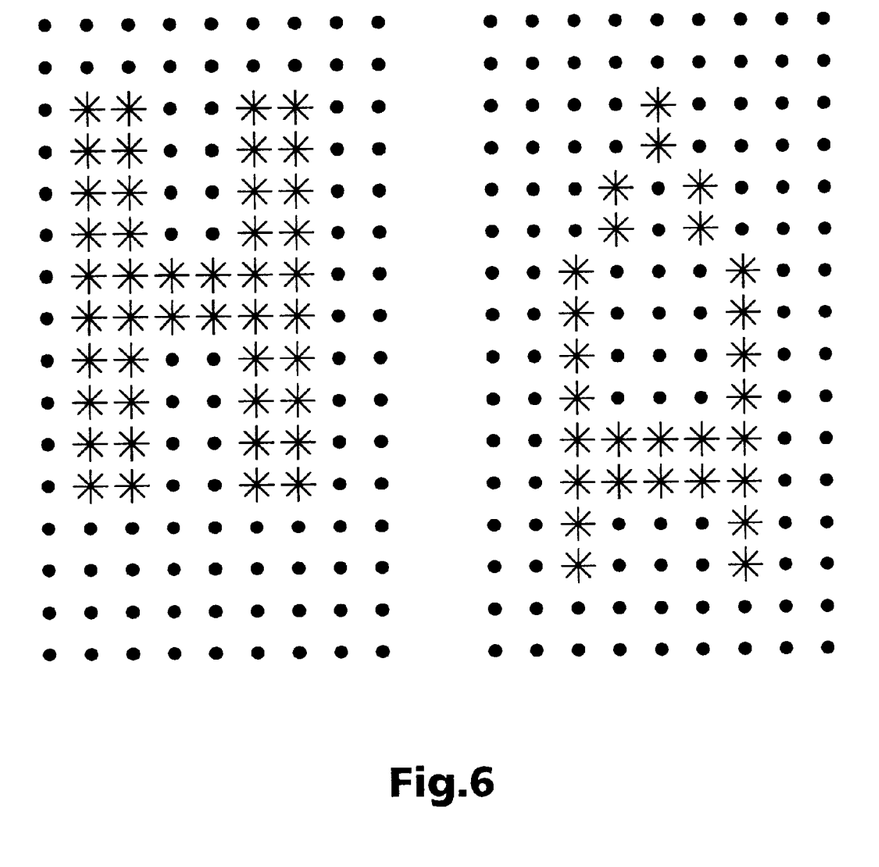
FIG. 6 shows an illustration of the structure of the displayed picture sections in accordance with FIGS. 3–5 with pixels taking account of the line interlacing method.

The subsequent command SET_DAREA specifies the X and Y coordinates for the start and end points of the sub-picture to be displayed (the basic form is a rectangular area) in the picture. The subsequent command SET_DSPXA specifies the beginning of the data area with the bitmap data of the sub-picture. This command specifies, separately in every case, where the data for the first field of the video picture are to be found and where the data of the second field of the video picture are to be found. The illustrated case of the first display control command sequence SP_DCSQ0 specifies that the same data are to be evaluated for both fields. This is a special case; however, according to the DVD standard it is likewise allowed to select different data areas for the different fields in this case. The double evaluation of the same data means that each video line is practically doubled. The reproduced picture then has the form as shown in FIG. 6 for the two letters H and A.

The display of the object to be represented is started with the command STA_DSP. The end command CMD_END indicates the end of the first display control command sequence.

The second display control command sequence SP_DCSQ1 follows next. The first command SP_DCSQ_STM of the first display control command sequence defines the fact that this display control command sequence becomes valid after the 30th video frame. The picture generated in the first display control command sequence would thus continue to be displayed for this long. Since the sub-picture data unit is designed for an NTSC system, with in each case 30 video frames per second, this specification, to put it another way, means that the letter H is displayed for one second and then a display change takes place. The next pointer command SP_NXT_DCSQ_SA again specifies the beginning of the subsequent display control command sequence to be processed. The specification is such that the beginning of the third display control command sequence SP_DCSQ2 is pointed to. The command SET_CONTR again follows next. With this command, the contrast for the four different pixel types is set in such a way that the pixel types "Emphasis 1" and "Background" reproduce the pixel value "Off" and the pixel types "Emphasis 2" and "Pattern" reproduce the pixel value "On". This reproduces the second picture section with the letter A. Thus, after the start of the second display control command sequence, the letter A will appear on the screen. The display control command sequence SP_DCSQ1 then ends with the end command CMD_END.

The third display control command sequence SP_DCSQ2 then follows. The first command SP_DCSQ_STM defines the start instant for this display control command sequence in such a way that the display control command sequence SP_DCSQ2 is started from the 60th video frame. The pointer command SP_NXT_DCSQ_SA then follows as the next command. This command defines the fact that the next display control command sequence begins from the memory address $0047. Consequently, the result is that the last display control command sequence is endlessly repeated until a new sub-picture data unit SPU is started or the sub-picture decoder is stopped. The next command STP_DSP deactivates the display of the sub-picture. The display control command sequence SP_DCSQ2 is again ended with the end command CMD_END. Another stuffing byte is entered as the last byte and likewise has the same hexadecimal value as the end command. This stuffing byte has been inserted in order to fulfil the rule established in the DVD standard whereby a sub-picture data unit may comprise an even number of memory locations.

Figure 5:
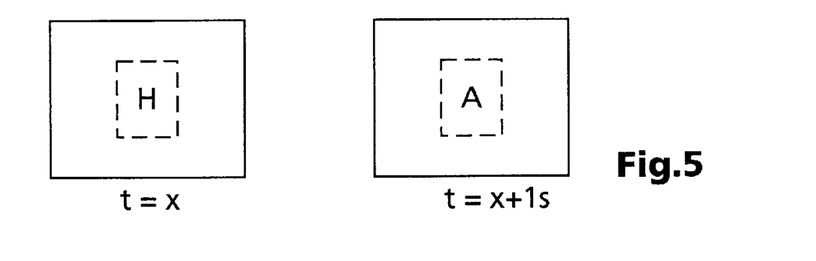
FIG. 5 shows the successive display of the individual picture sections in the sub-picture data unit corresponding to FIGS. 3 and 4.

In the event of this sub-picture data unit that has been presented being processed, the sequence illustrated in FIG. 5 then appears on the screen. Firstly, at an instant which is designated as t=x in FIG. 5, the letter H is inserted in the picture for one second, and then the letter A is inserted likewise for the next second, to be precise at the same location in the picture as the letter H beforehand.

More complicated sub-picture data units can also be generated in the same way. By way of example, a sub-picture data unit may be constructed in such a way that it successively inserts the numbers 10 to 0 on the screen for one second in each case, with the result that, as it were, a countdown proceeds on the screen in order to announce some occurrence. In that case, two successive numbers are respectively coded in a combined manner and stored in the PXD data field. The combined numbers are then reproduced in the same way as described in the sub-picture data unit in FIG. 4. In that case, however, it should also be taken into account that the SET_DSPXA command must in each case be used to select which data area is to be evaluated for which numbers. In this way, it is then possible for 10 conventional sub-picture data units for the 10 different numbers to be replaced by a single sub-picture data unit having just 5 different combined objects. This simplifies the overall programming process.

Figure 7:
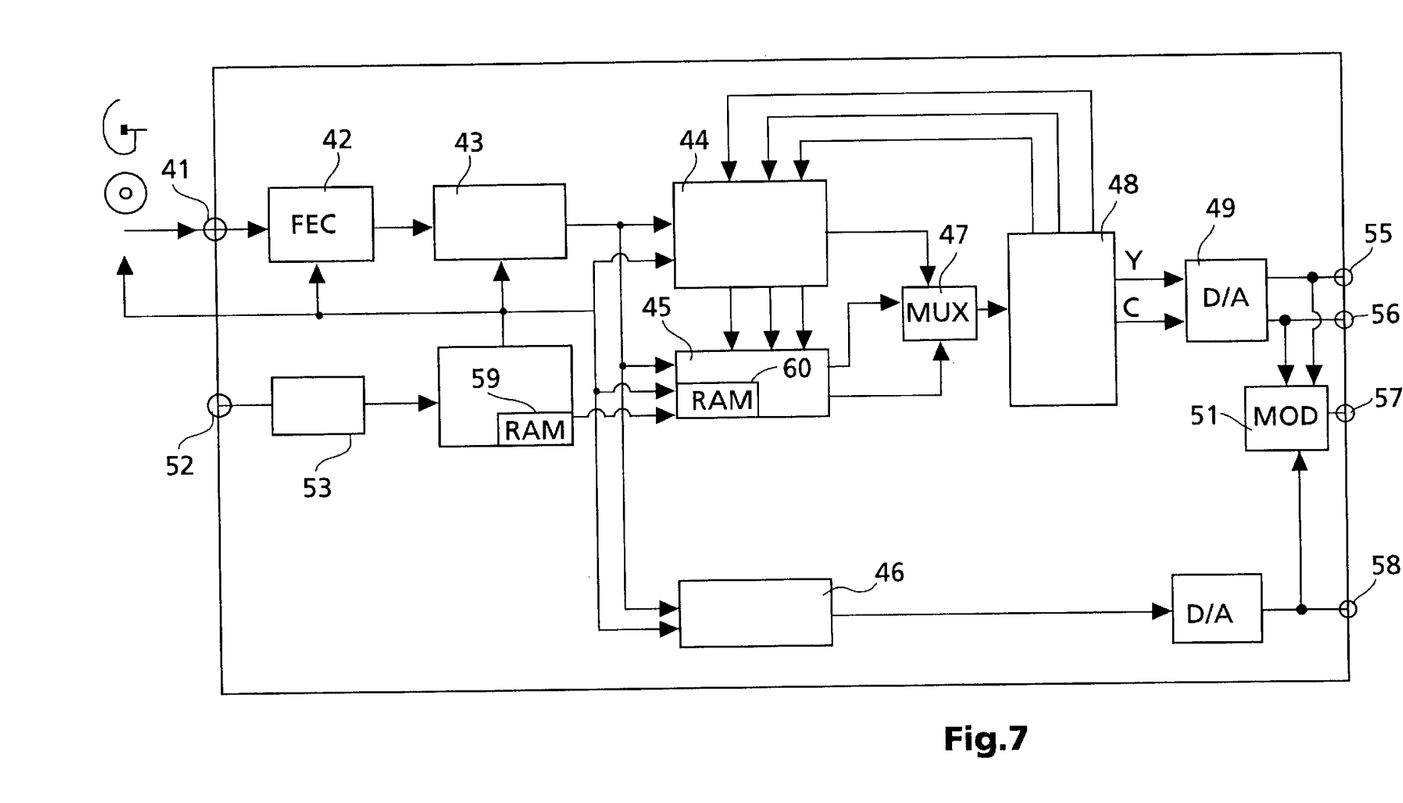
FIG. 7 shows a rough block diagram of a DVD playback apparatus.

FIG. 7 also shows a rough block diagram of a DVD playback apparatus. The reference numeral 41 designates a serial data input. A bit stream is present here which contains both video data and audio data and the data for the subtitles which are to be displayed. The data originate from an optical storage disc (DVD) in that case. The incoming data are then firstly subjected to error detection and error correction in a correction unit 42. The data subsequently pass into a separator circuit 43, in which the video, audio and sub-picture data, which are still mixed together, are separated and respectively transferred accordingly either to a video decoding unit 44, a sub-picture decoding unit 45 or an audio decoding unit 46. The decoded video and sub-picture data are entered into a multiplexing unit 47. The multiplexing unit 47 is controlled by the sub-picture decoding unit 45. At the output of the multiplexing unit 47, the data for the individual pixels of the video picture are successively input into a TV signal encoding device 48. At the outputs of the TV signal encoding device, the standard-conforming luminance and chrominance signal (Y, C) is output in digital form. Depending on the design of the apparatus, the signal may correspond to the PAL, SECAM or NTSC video standard. These signals are subsequently converted into analogue signals in the digital-to-analogue conversion unit 49 and forwarded to corresponding outputs 55, 56. The associated audio signal is already generated in a standard-conforming manner in the decoding device 46 and is converted into an analogue audio signal in the digital-to-analogue conversion unit 50. Only a mono signal is illustrated in the case shown. This audio signal is made available at the output 58. The implementation may, on the other hand, also be such that the analogue luminance and chrominance signal and the audio signal are modulated onto different carriers in a modulation unit 51 and output as a corresponding TV CVBS signal via just one output 57.

In addition, an infrared input is designated by the reference numeral 52. This infrared input serves to receive the infrared signals from a remote-control unit. The corresponding interface circuit which analyses the received infrared signals is designated by the reference numeral 53. The reference numeral 54 designates a microcontroller. The latter also receives the conditioned command words from the infrared interface 53. The microcontroller 54 also serves to control the units 42 to 46 via a corresponding control bus. Control is effected for example by the above-mentioned units being initialized to specific starting values. With regard to the detailed construction of the sub-picture decoding unit 45, reference is also made at this point to the document EP-A-0 725 541, which likewise contains details regarding sub-picture data unit generation as well. In this regard, therefore, reference is also expressly made to this document.

The exemplary embodiments that have been presented are only examples and can be altered by diverse modifications. In particular, the method need not necessarily be used for the generation and processing of sub-picture data units for DVD apparatuses. The method can generally be used for picture coding and/or also picture decoding. In that connection, a picture to be reproduced is divided into sections and in each case two or more sections are combined with one another before being coded, and, during reproduction, the individual sections are in each case recovered individually.

One modification may also be configured in such a way that two respective pictures which are intended to be successively displayed individually are coded in a combined manner and are then separated again in the course of decoding and displayed one after the other, as described.

What is claimed is:

1. Method for picture coding a digital picture divided into two or more sections, said method comprising:
coding a respective number of sections in a combined manner; such that a combined pixel is generated from each of corresponding pixels in the sections to be combined, and
allocating to said combined pixel an unambiguous type (A, B, C, D) corresponding to distribution of pixel values in the N-tuple of the corresponding pixels.

2. Method for picture coding comprising:
coding two or more successive pictures of a picture sequence in a combined manner, such that a combined pixel is generated from each of the corresponding pixels in the pictures to be combined, and
allocating to the combined pixel an unambiguous type (A, B, C, D) corresponding to distribution of the pixel values in the N-tuple of the corresponding pixels.

3. Method according to claim 1 or 2, further comprising allocating an "On" value or an "Off" value to pixels of the pictures or picture sections and assigning each of the combined pixels to be one of four different pixel types (A, B, C, D) depending on which pixel in the respective pair of the corresponding pixels has which said value.

4. Method according to claim 3, wherein said assigning comprises:
assigning the combined pixel value as type A if the corresponding pixels both have the "Off" value;
assigning the combined pixel value as type B if the corresponding pixels both have the "On" value;
assigning the combined pixel value as type C if the pixel of the first picture section or picture has the "On" value and the pixel of the second picture section or picture has the "Off" value;
assigning the combined pixel value as type D if the pixel of the first picture section has the "Off" value and the pixel of the second picture section or picture has the "On" value.

5. Method according to claim 3, wherein the picture sections or pictures to be combined are combined only in a partially overlapping manner, and wherein said allocating comprises absent pixels outside the overlap area are allocated the "Off" value.

6. Method according to claim 3, further comprising subjecting the combined pixels to run length coding.

7. Method for coding and decoding a picture comprising:
coding said picture with one of a first coding and a second coding, said first coding including coding a respective number of sections are coded in a combined manner such that a combined pixel is generated from each of corresponding pixels in the sections to be combined, said combined pixel being allocated an unambiguous type (A, B, C, D) corresponding to distribution of pixel values in the N-tuple of the corresponding pixels, and said second coding including coding two or more successive pictures of a picture sequence in a combined manner such that a combined pixel is generated from each of the corresponding pixels in the pictures to be combined, the combined pixel being allocated an unambiguous type (A, B, C, D) corresponding to distribution of the pixel values in the N-tuple of the corresponding pixels; and
decoding the data section with the combined pixels in a plurality of passes, pass one of the picture sections or one of the pictures being reconstructed and different selection rules being employed in each case, said selection rules determine determining which value is to be assigned to a pixel.

8. Method according to claim 7, further comprising:
allocating an "On" value or an "Off" value to pixels of the pictures or picture sections and assigning each of the combined pixels to be one of four different pixel types (A, B, C, D) depending on which pixel in the respective pair of the corresponding pixels has which said value, and
wherein said decoding further comprises decoding is performed in two passes, the following selection rule holding true in one pass: two of the possible four different pixel types of a combined pixel reproduce the "On" pixel value and the other two of the possible four different pixel types reproduce the "Off" pixel value.

9. Method according to claim 8, wherein said assigning comprises:
assigning the combined pixel value as type A if the corresponding pixels both have the "Off" value;
assigning the combined pixel value as type B if the corresponding pixels both have the "On" value;
assigning the combined pixel value as type C if the pixel of the first picture section or picture has the "On" value and the pixel of the second picture section or picture has the "Off" value;
assigning the combined pixel value as type D if the pixel of the first picture section has the "Off" value and the pixel of the second picture section or picture has the "On" value; and wherein for the reproduction of the first picture section or of the first picture, the two pixel types B and C reproduce the "On" value and the two pixel types A and D reproduce the "Off" value, and for the reproduction of the second picture section or of the second picture, the two pixel types B and D reproduce the "On" value and the two pixel types A and C reproduce the "Off" value.

10. Method for constructing a sub-picture data unit for an electronic apparatus said method comprising:
containing within the sub-picture data unit a data area (21) having the pixel values for one or more sub-pictures and a command area (22) having display control command sequences (SP_DCSQ0–SP_DCSQ2),
assuming by the pixels of the pictures or picture sections only two values, called "On" and "Off" values, coding in each case two picture sections or pictures in a combined manner and it being possible for the combined pixels to be four different types (A, B, C, D), depending on which pixel in the respective pair of pixels has which value, and providing in at least one display control command sequence (SP_DCSQ0, SP_DCSQ1) the reproduction of the pixel values of one of the combined picture sections or of one of the combined pictures in the sub-picture data unit.

11. Method according to claim 10, further comprising providing in a separate display control command sequence (SP_DCSQ0, SP_DCSQ1) respectively the reproduction of each of the combined picture sections or pictures.

12. Method according to claim 10, wherein said sub-picture data unit is a DVD sub-picture data unit for a DVD apparatus.

13. Method according to claim 12, wherein commands SET_CONTR or CHG_COLCON defined in a DVD standard are used to define a selection rule which determines the way in which the combined pixels are to be evaluated for the reproduction of a picture section or of a picture.

14. Method according to claims 12, further comprising:

assigning the combined pixel value as type A if the corresponding pixels both have the "Off" value;

assigning the combined pixel value as type B if the corresponding pixels both have the "On" value;

assigning the combined pixel value as type C if the pixel of the first picture section or picture has the "On" value and the pixel of the second picture section or picture has the "Off" value;

assigning the combined pixel value as type D if the pixel of the first picture section has the "Off" value and the pixel of the second picture section or picture has the "On" value; wherein each of the pixel types A, B, C, D is assigned, in a mathematically one-to-one manner, one of the pixel types "Background Pixel", "Pattern Pixel", "Emphasis 1 Pixel" and "Emphasis 2 Pixel" defined in a DVD standard.

15. Method according to claim 10, employing said sub-picture data unit in a DVD apparatus for generating a picture or sub-picture or a picture sequence or sub-picture sequence.

16. Method according to claim 15, employing the display control command SET_CONTR or CHG_COLCON defined in the DVD standard to define the selection rule which determines the way in which the combined pixels are to be evaluated for the reproduction of a picture section or of a picture.

17. Method according to claim 15, further comprising:

assigning the combined pixel value as type A if the corresponding pixels both have the "Off" value;

assigning the combined pixel value as type B if the corresponding pixels both have the "On" value;

assigning the combined pixel value as type C if the pixel of the first picture section or picture has the "On" value and the pixel of the second picture section or picture has the "Off" value;

assigning the combined pixel value as type D if the pixel of the first picture section has the "Off" value and the pixel of the second picture section or picture has the "On" value; wherein each of the pixel types A, B, C, D is assigned, in a mathematically one-to-one manner, one of the pixel types "Background Pixel", "Pattern Pixel", "Emphasis 1 Pixel" and "Emphasis 2 Pixel" defined in the DVD standard.

18. Method according to claim 10, further comprising employing a said sub-picture data unit in an electronic apparatus, including a DVD apparatus, for the purpose of displaying a picture section or a picture.

19. Method according to claim 10, further comprising storing said sub-picture data unit on a data carrier comprising a DVD disc.

* * * * *